United States Patent [19]
Neustadt

[11] Patent Number: 6,106,126
[45] Date of Patent: Aug. 22, 2000

[54] ELECTRONICS LAYOUT OF AN EXIT SIGN

[76] Inventor: Jerome Neustadt, 5 Holly Ave., Florida, N.Y. 10921

[21] Appl. No.: 09/167,016

[22] Filed: Oct. 6, 1998

Related U.S. Application Data

[60] Provisional application No. 60/061,556, Oct. 7, 1997.

[51] Int. Cl.[7] .................................................. F21V 9/02
[52] U.S. Cl. .......................... 362/20; 362/251; 362/812; 40/570
[58] Field of Search ............................. 362/20, 254, 251, 362/276, 812, 800; 40/570

[56] References Cited

U.S. PATENT DOCUMENTS

| | | | |
|---|---|---|---|
| 5,365,411 | 11/1994 | Rycroft et al. ............................. | 362/20 |
| 5,539,623 | 7/1996 | Gurz et al. ................................. | 362/20 |
| 5,768,814 | 6/1998 | Kozekn et al. ............................ | 40/570 |
| 5,897,194 | 4/1999 | Ham ......................................... | 362/20 |

*Primary Examiner*—Cassandra Spyrou
*Assistant Examiner*—Fayez Assaf
*Attorney, Agent, or Firm*—D. Peter Hochberg; William H. Holt

[57] ABSTRACT

An electronic layout of an electronic exit sign, that encompasses the entire electronic packaging and lighting inside the exit sign enclosure. The layout includes brackets that function both as a method for holding LEDs for illuminating the sign, and as enclosures for enclosing the electronics of a controller and a power unit. The LEDs are mounted to the brackets and held by nylon buttons. A battery pack for battery backup and a battery backup self-test switch is mounted to a releasable plate. This allows the battery backup feature to be an option and also allows for easy replacement of discharged batteries. The LEDs are spaced in such a way as to provide uniform lighting to both the exit sign and a chevron symbol. The LEDs are positioned so that the same unit can drive either a single or double face exit.

5 Claims, 4 Drawing Sheets

ELECTRONICS LAYOUT OF AN EXIT SIGN

CROSS REFERENCE TO RELATED APPLICATIONS

This application claims benefit of U.S. Provisional Patent Application, Ser. No. 60/061,556 filed Oct. 7, 1997, under Title 35 United States Code §119(e).

BACKGROUND OF THE INVENTION

1. Field of the Invention

The present invention relates generally to an electronics layout and more particularly to an improved electronics layout for an illuminated exit sign.

2. Description of Prior Art

Exit signs that illuminate are used for many applications, such as the inside of stores, parking garages, theatres, offices, industrial plants and many others. The exit signs are usually comprised of an enclosure, a plastic face on one or both sides, lights inside the enclosure and electronics for illuminating the lights. The plastic face usually has the word exit and an arrow or chevron embossed on it in red with a white background. These units require a transformer or power assembly for converting an AC power source to DC power for turning on the lights within the enclosure. The lights are arranged to provide light uniformly within the enclosure so the exit sign illuminates at a particular brightness in dark or dim areas. Additionally, in many commercial building applications these signs require a battery backup source that will drive the exit sign with a specified brightness in the event of a power loss.

Due to the arrangement of the lights or light emitting diodes (LEDs) for providing uniform lighting within the enclosure, and the necessary control circuitry needed to provide a battery backup, a separate enclosure is necessary for the electronics. These enclosures are sometimes referred to as canopies, and may contain the power assembly, the control circuitry and batteries for battery backup. This is especially the case in double face exit signs.

The present invention alleviates the need for using canopies (to store components) by designing an electronic layout that allows the entire electronic package to be contained in the exit sign housing. Further, this invention provides a layout that can be used in both single and double face exit signs.

SUMMARY OF THE INVENTION

In accordance with a preferred embodiment of the present invention, the invention is an electronic layout of an electronic exit sign that encompasses the entire electronic packaging and lighting inside an exit sign enclosure. The layout includes brackets that function both as a method for holding LEDs for illuminating the sign, and also as enclosures for the electronics of a controller and a power unit. The enclosure could be made from steel, or a comparable plastic material, which is UL listed, for the purpose of preventing fire or shock hazard. Nylon buttons provide an inexpensive way of installing the LEDs and replacing burned out LEDs that are mounted to the brackets. A battery pack for battery backup and a battery backup self-test switch is mounted to a releasable or down plate. This allows the battery backup feature to be an option and also allows for easy replacement of discharged batteries. The LEDs are spaced in such a way as to provide uniform lighting to both the exit sign and a chevron symbol. The LEDs are positioned, so that the same unit can drive either a single or double face exit.

An object of this invention is to provide a fully self-contained electronic exit sign.

Another object of this invention is to provide a fully self-contained electronic exit sign that includes a battery backup.

An additional object of this invention is to provide a fully self contained electronic exit sign with a battery backup that includes a battery backup self-test.

Another object of this invention is to provide a fully self contained electronic exit sign that has uniform lighting for both an exit word and a chevron symbol.

A further object of this invention is to provide a fully self-contained electronic exit sign that can be used in a single face or double face exit sign.

Another object of this invention is to provide an easy to manufacture, easy to repair low cost electronic exit sign.

These and other objects will become apparent from the following description of a preferred embodiment taken together with the accompanying drawings and the appended claims.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein.

DETAILED DESCRIPTION OF PREFERRED EMBODIMENT

Figure 1:
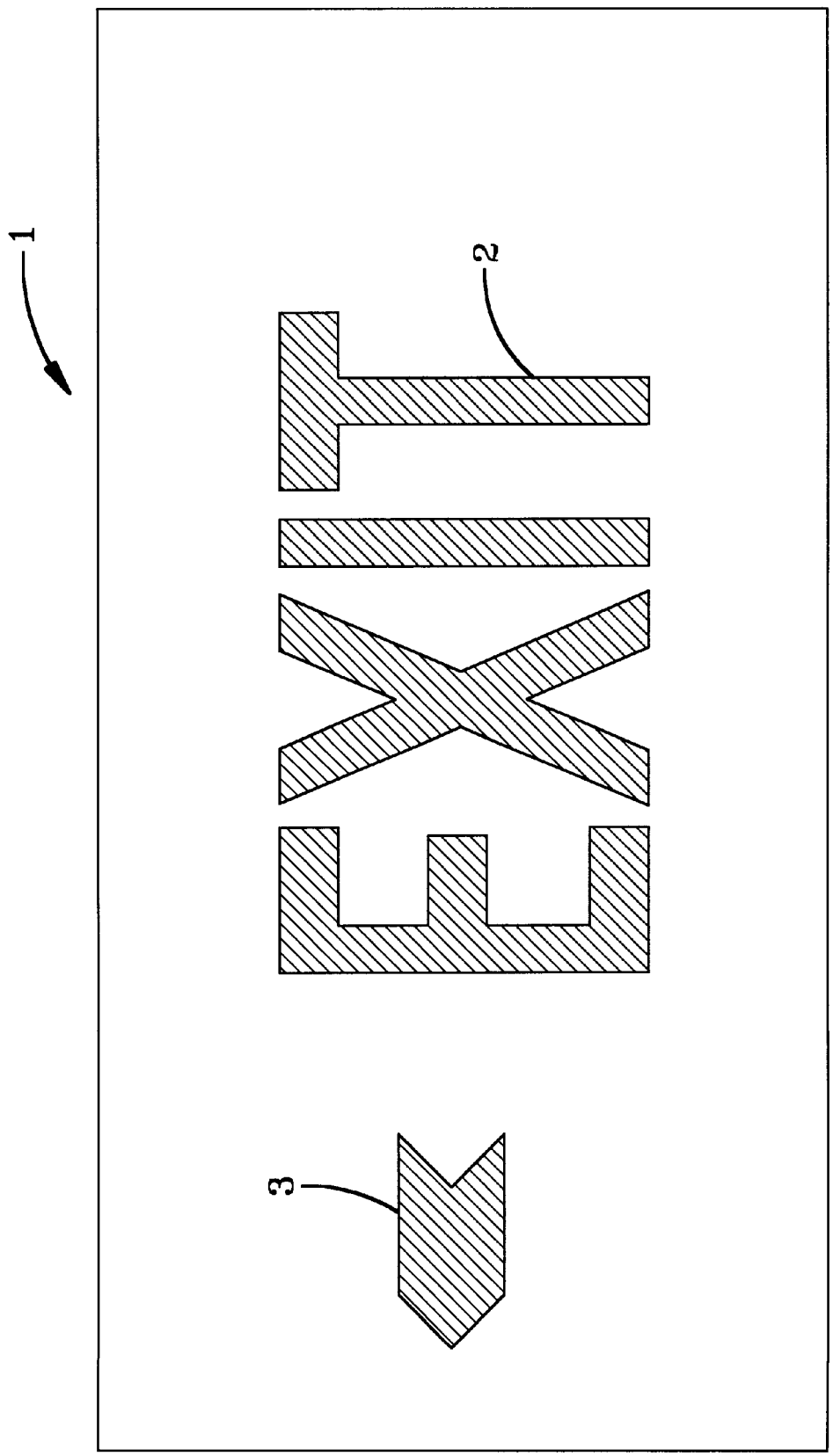
FIG. 1 is a front view of an electronic exit sign.

Referring now to the drawings wherein the showings are for the purpose of illustrating the preferred embodiment of the invention only, and not for the purpose of limiting the same, FIG. 1 shows a front view of a double faced illuminated electronic exit sign. Exit sign 1 is comprised of a metallic enclosure or casing, with the word EXIT and a chevron symbol cut out of the face of the enclosure. The front portion of the enclosure has the word EXIT and the chevron embossed onto plastic sheets 2, 3. Typically, the letters of exit sign 1 could be made with either six or eight inch letters. Sheets 2 and 3 are affixed underneath the lower surface of the front portion, so they align with the cutouts in the metallic casing. Although the casing is metal and the plates are plastic, both could be comprised of plastic or both could be made of a variety of other materials.

Figure 2:
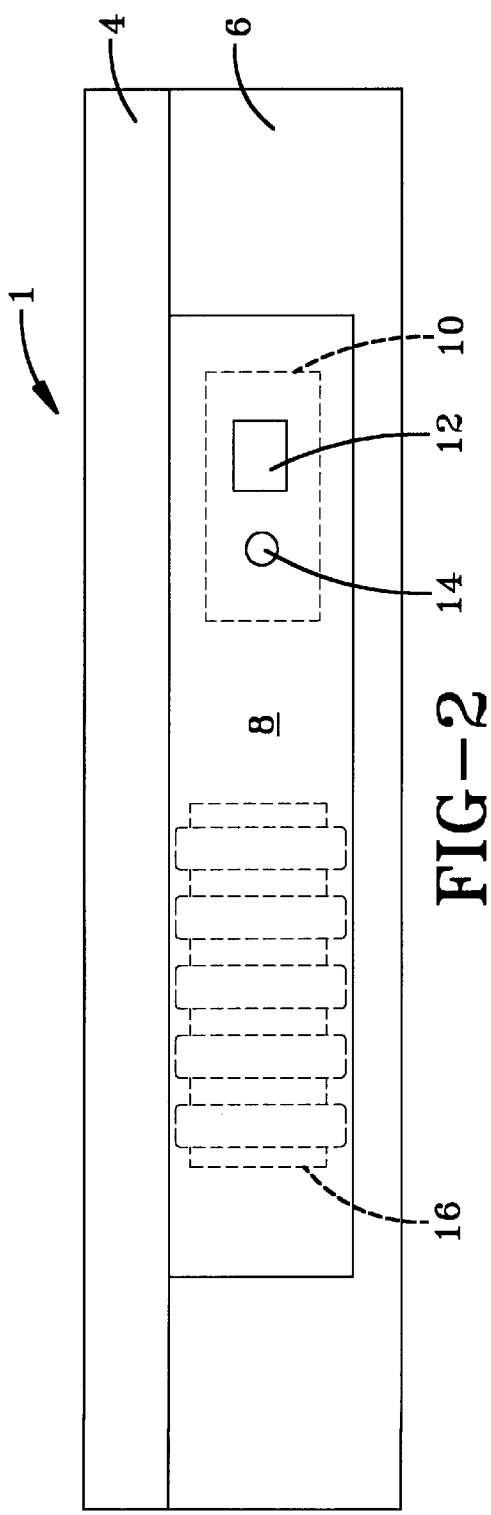
FIG. 2 is a top view of an electronic exit sign.

As can be seen in FIG. 2, the electronic sign 1 has a front portion 4, a rear portion 6, and a down plate 8 forming the enclosure. A battery pack 16 and a switch 10 are attached to the interior of down plate 8. The switch 10 has button 12 and a LED 14 protruding from the front of down plate 8.

Figure 3:
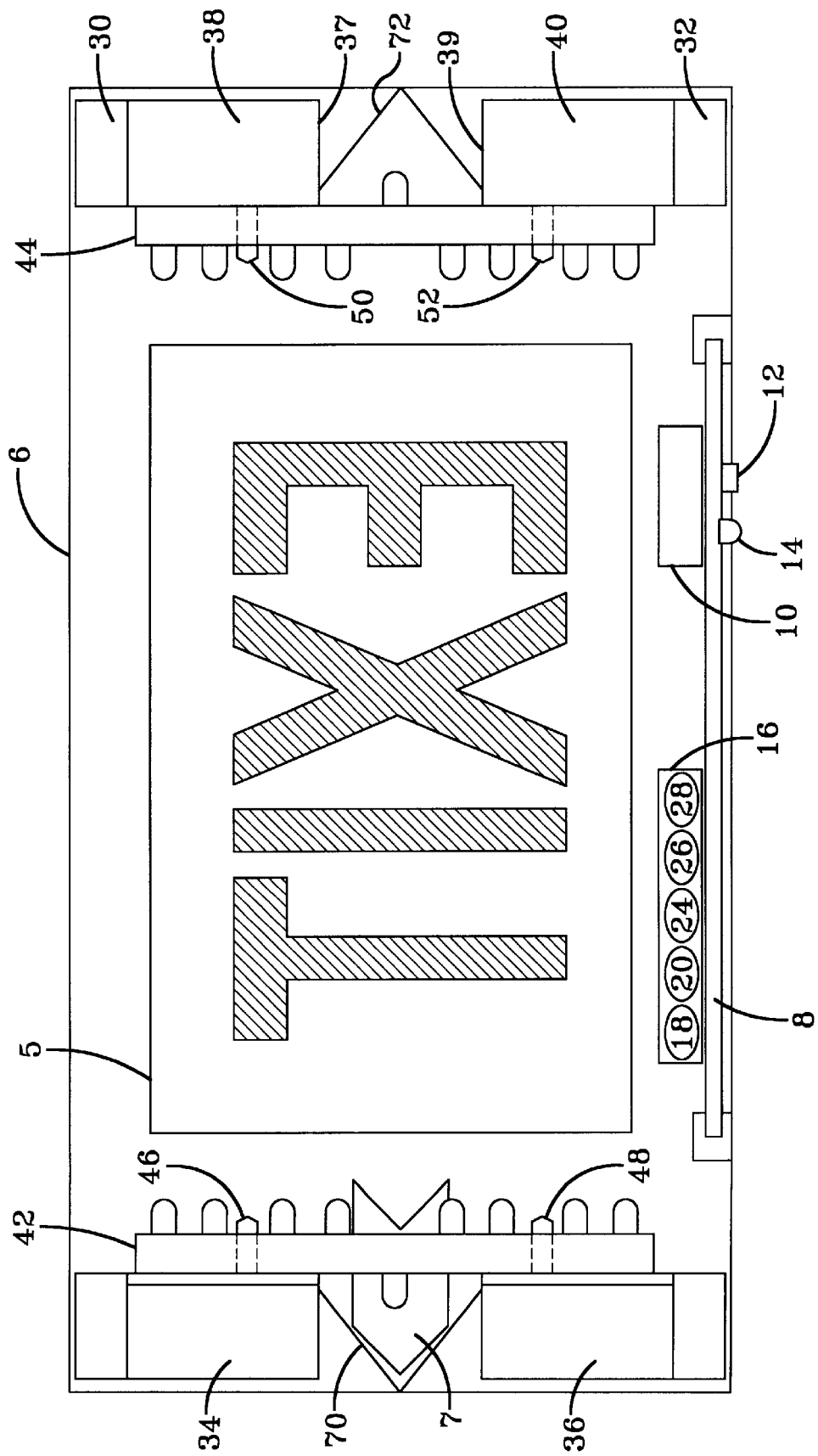
FIG. 3 is a front view of an electronic exit sign with the front portion removed.

FIG. 3 displays the layout of the electronics in rear portion 6 of electronic sign 1, with front portion 4 removed. Another plastic plate 5 embossed with a legend such as the word "EXIT", and another plastic plate 7 embossed with a chevron symbol, are attached to the interior surface of rear portion 6. V-shaped walls 70 and 72 are disposed on both sides of the "EXIT" and surrounding the chevron symbol. V-shaped walls 70 and 72 are provided to increase the intensity of light illuminating the chevron symbol. Brackets 30, 32, 34, 36, are affixed in each corner of rear portion 6. Nylon buttons 46, 48, 50, 52 protrude from the brackets for holding LED units 42 and 44 on the inside of the brackets. Additionally, a power unit 38 and a controller circuit 40 are mounted to the opposite side of the bracket and being enclosed in their own casing 37, 39. Brackets 30 and 32 have a dual purpose, which is to hold LED unit 44, and to seal power unit 38 and control circuit 40, thus creating a more compact design. Down plate 8 has a battery pack 16 and a battery backup self test switch 10 affixed to the rear surface of plate 8. Down plate 8 is releasably slidable into rear portion 6. This provides a battery backup feature that can be an option to the customer. This also allows for easy replacement of discharged batteries. Battery pack 16 is comprised of five batteries 18, 20, 24, 26, and 28 that provide enough current to illuminate the LEDs on the LED units 42, 44 for approximately 90 minutes. Power unit 38 is comprised of a transformer that converts AC voltage to DC voltage. Normally power unit 38 provides current to the LEDs for operation. However, in the event of an AC power failure control circuit 40 senses the failure and relays the battery pack voltage to the LEDs. Depressing and holding self-test switch 10 will also perform this function. The power and time requirements may vary depending on the particular application.

Figure 7:
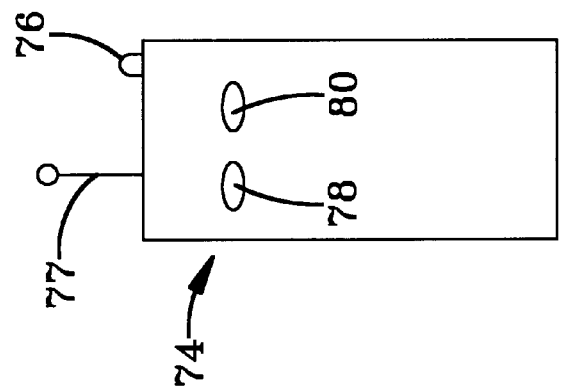
FIG. 7 is a front view of a remote control unit.
Figure 6:
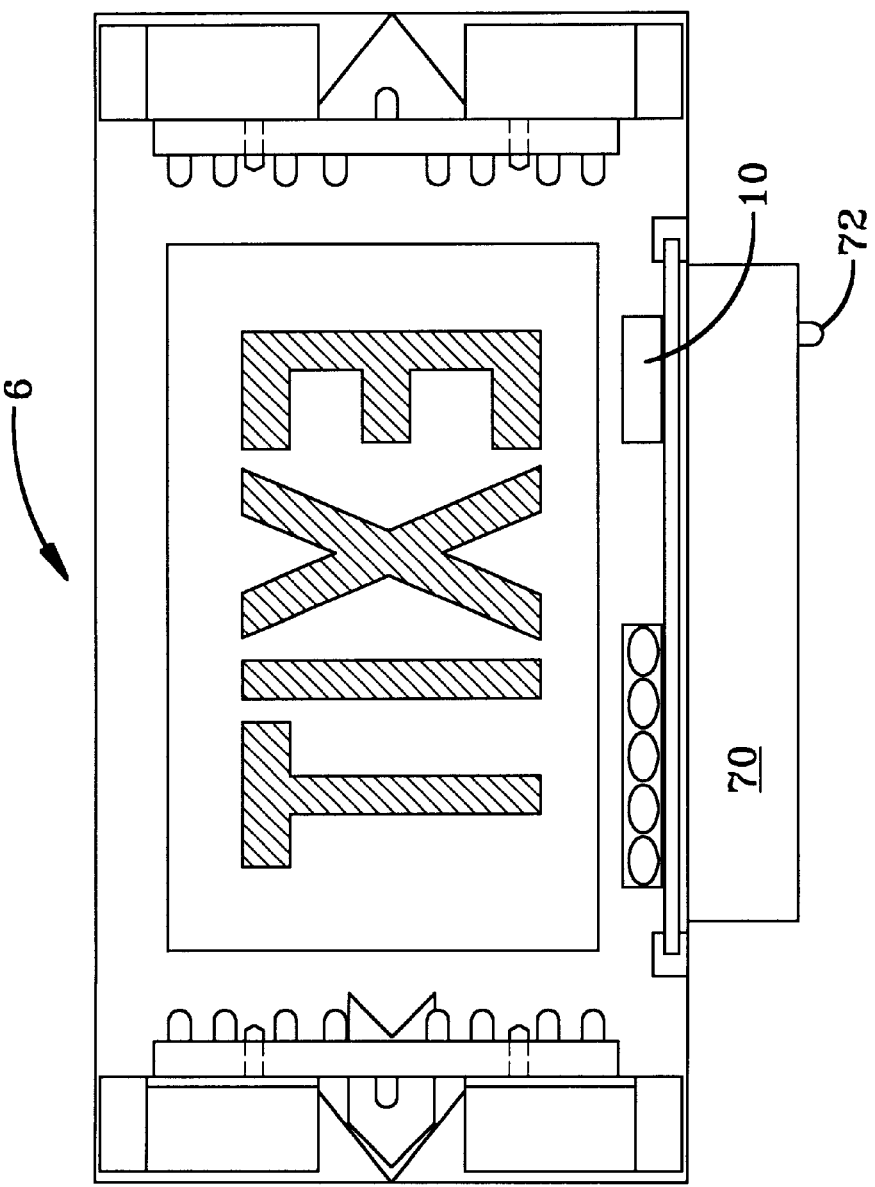
FIG. 6 is a view of the electronic exit sign shown in FIG. 3 with an infra red receiver box.

It should be appreciated that self test switch 10 is not limited to a push button switch. Referring to FIGS. 6 and 7, rear portion 6 of the electronic sign includes a receiver box 70. Receiver box 70 includes all of the circuiting necessary for receiving and decoding a radio frequency signal from a remote control unit 74. Preferably, the remote control unit operates at a frequency of 300 megahertz. Remote control unit 74 includes a test button 78, a reset button 80 and a test in progress LED 76. A user can press test button 78 on remote control unit 74 and transmit a signal through an antenna 77 to receiver box 70. The circuitry in receiver box 70 receives the signal, decodes the signal and switches self test switch 10 from AC power to battery power. An LED 72 remains illuminated while the device is powered by AC power and turns off when the device is powered by battery power. Pressing reset button 80 sends a reset signal to receiver box 70 and switches self test switch 10 from battery power to AC power. Typically, the remote control unit has a range of at least fifteen feet. The remote controller and the receiver box combination allows for easy periodic checking of the battery backup circuitry without the aid of a ladder. The radio frequency transmitter and receiver arrangement could be replaced by an infra-red transmitter and receiver.

Figure 5:
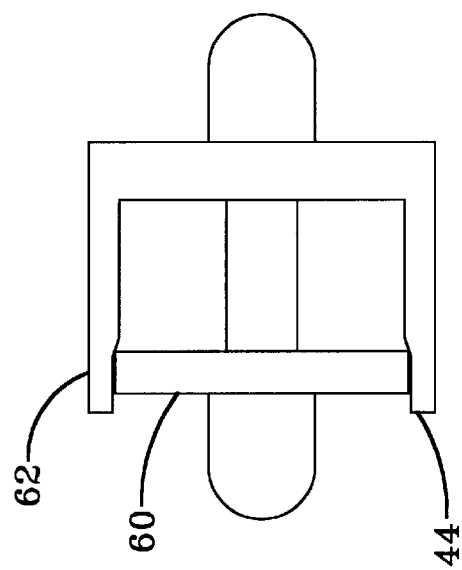
FIG. 5 is a side view of a LED unit.
Figure 4:
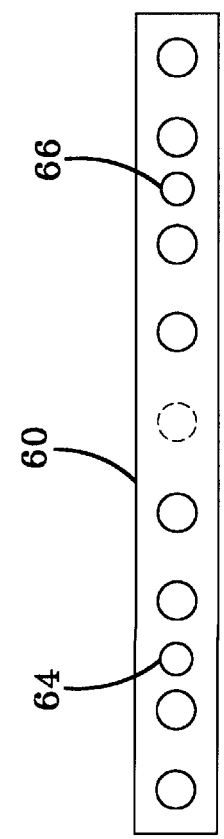
FIG. 4 is a front view of a LED stick.

Referring to FIGS. 4 and 5, LED units 42 and 44 are comprised of a LED stick 60 and a vinyl LED enclosure 62. The LED sticks have 9 equally spaced LEDs, with eight on the front surface for lighting the exit display, and a center LED on the rear surface for lighting the chevron. It should be appreciated that the formation and number of LEDs may vary depending on the amount of light needed to be generated for a given application. Vinyl LED enclosure 62 and the LED stick 60 have apertures 64 and 66. This allows for affixing the LED units to the brackets through the vinyl knobs. Using the vinyl knobs and vinyl enclosures, allow for easy installation and replacement of the LED units and are also very low in cost. The LED units protrude from the brackets and are vertically centered in the enclosure. This in combination with the spacing of the LEDs gives the exit sign uniform illumination for both the word exit and the chevron symbol. This design permits the same unit to drive either a single or double face exit.

As can be seen from the description, this layout not only provides the advantages previously stated, but is also easy to manufacture, minimal in cost and easy to repair. This layout can apply to exit signs of varying sizes. The only difference will be the size and spacing of the LED units and the spacing of the brackets.

The foregoing description is a specific embodiment of the present invention. It should be appreciated that this embodiment is described for purposes of illustration only, and that numerous alterations and modifications may be practiced by those skilled in the art without departing from the spirit and scope of the invention. It is intended that all such modifications and alterations be included insofar as they come within the scope of the invention as claimed or the equivalents thereof.

What is claimed is:

1. An exit sign assembly comprising:

an enclosure housing having a front portion, a rear portion, a first side portion, a second side portion spaced from and opposing the first side portion, an upper portion and a lower portion;

a plate having an exit legend located thereon in at least one of the front portion and the rear portion, said plate being located between the first side portion and the second side portion;

a power unit in the first side portion for transmitting electric power;

first bracket means for holding said power unit in the first side portion;

a first LED lamp assembly comprising a set of LED lamps, said LED lamp assembly being connected to said first bracket means to secure said first LED lamp assembly in said first side portion for extending along one side of said plate;

a second LED lamp assembly comprising a set of LED lamps, said second LED lamp assembly secured in said second side portion; and said first and second LED lamp assemblies being electrically connected to said power unit for being illuminated upon the generation of electrical power by said power unit;

a down plate mounted in said lower portion, and a battery pack electrically connectable to said first and second LED lamp assemblies, and a manually accessible test switch for testing the operation of said battery pack for illuminating said first and second LED lamp assemblies, mounted on said down plate;

a controller for sensing the failure of said power unit to transmit electrical power and for relaying battery pack voltage to said LED lamp assemblies, said controller being mounted in said first side portion.

2. An exit sign assembly according to claim 1 wherein the exit legend on said plate includes the word EXIT and a pair of chevrons in each of side in said first side portion and said second side portion, and each of said LED lamp assemblies has a LED bulb located adjacent one of said chevrons.

3. An exit sign assembly according to claim 1 wherein said exit sign assembly comprises said plate mounted in the front portion and a second plate having an exit legend mounted in the rear portion, and wherein said first LED lamp assembly and said second LED lamp assembly illuminate both of said plates.

4. An exit sign assembly according to claim 1 wherein said down plate is removable to enable the changing of said battery pack.

5. An exit sign assembly according to claim 1 and further comprising a battery pack operably connected to said first and second LED lamp assemblies, a test switch assembly for testing the operation of said battery pack for illuminating said first and second LED lamp assemblies, said test switch assembly including a test switch and a receiver box for receiving remote electronic signals from a remote control unit, said receiver box being electrically connected to said test switch for operating said test switch assembly to determine if said battery pack can illuminate said first and second LED lamp assemblies.

\* \* \* \* \*